US007036490B2

(12) United States Patent
Veinotte

(10) Patent No.: US 7,036,490 B2
(45) Date of Patent: May 2, 2006

(54) ELASTOMERIC VAPOR FLOW CONTROL ACTUATOR

(75) Inventor: Andre Veinotte, Ontario (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/758,126

(22) Filed: Jan. 16, 2004

(65) Prior Publication Data

US 2004/0255915 A1 Dec. 23, 2004

Related U.S. Application Data

(60) Provisional application No. 60/440,864, filed on Jan. 17, 2003.

(51) Int. Cl.
*F02M 37/04* (2006.01)
*F16K 15/00* (2006.01)

(52) U.S. Cl. ................ 123/520; 251/129.01; 251/334; 251/339; 137/853

(58) Field of Classification Search ................ 123/516, 123/518, 519, 520; 251/129.01, 129.15, 251/129.21, 4, 331, 334, 339; 137/853
See application file for complete search history.

(56) References Cited

U.S. PATENT DOCUMENTS

| | | | |
|---|---|---|---|
| 3,055,631 A | | 9/1962 | Kippenhan |
| 3,740,019 A | | 6/1973 | Kessell et al. |
| 4,161,306 A | | 7/1979 | Brune et al. |
| 4,275,765 A | * | 6/1981 | Dugas .................. 137/625.48 |
| 4,284,263 A | | 8/1981 | Newcomb |
| 4,512,545 A | * | 4/1985 | Mar ............................ 251/4 |
| 4,628,887 A | * | 12/1986 | Mitchell et al. ............ 123/520 |
| 4,925,153 A | * | 5/1990 | Romer .................... 251/30.01 |
| 5,217,037 A | | 6/1993 | Bristol |
| 5,222,713 A | * | 6/1993 | Lawless et al. ........ 251/129.06 |
| 5,285,805 A | * | 2/1994 | Proper .......................... 137/1 |
| 5,386,849 A | | 2/1995 | Gilchrist et al. |
| 5,413,082 A | * | 5/1995 | Cook et al. ................. 123/520 |
| 5,464,189 A | * | 11/1995 | Li ................................ 251/4 |
| 5,868,375 A | * | 2/1999 | Reinicke et al. ....... 251/129.21 |
| 6,026,847 A | | 2/2000 | Reinicke et al. |
| 6,371,437 B1 | * | 4/2002 | Kenny et al. ................. 251/11 |
| 2003/0107013 A1 | | 6/2003 | Pappo et al. |

* cited by examiner

*Primary Examiner*—Thomas Moulis

(57) ABSTRACT

A canister purge valve for regulating fuel vapor flow between a fuel vapor collection canister and an intake manifold of an internal combustion engine. The canister purge valve includes a body defining a passage extending between a first port and a second port. The first port is adapted for fuel vapor communication with the fuel vapor collection canister. The second port is adapted for fuel vapor communication with the intake manifold of the internal combustion engine. A seat is disposed in the passage. The seat defines an aperture having a sealing surface disposed about a central axis. An elastomeric actuator extends through the aperture, and is deformable between a first configuration that engages the sealing surface to prohibit fuel vapor flow through the aperture, and a second configuration spaced from the sealing surface to permit fuel vapor flow through the aperture.

5 Claims, 2 Drawing Sheets

ELASTOMERIC VAPOR FLOW CONTROL ACTUATOR

CROSS REFERENCE TO CO-PENDING APPLICATIONS

This application claims the benefit of the earlier filing date of U.S. Provisional Application No. 60/440,864, filed Jan. 17, 2003, the disclosure of which is incorporated by reference herein in its entirety.

FIELD OF THE INVENTION

This invention relates generally to on-board emission control systems for internal combustion engine powered motor vehicles, e.g., evaporative emission control systems, and more particularly to an emission control valve, such as a canister purge valve for an evaporative emission control system.

BACKGROUND OF THE INVENTION

A known on-board evaporative emission control system includes a vapor collection canister that collects fuel vapor emitted from a tank containing a volatile liquid fuel for the engine, and a canister purge solenoid (CPS) valve for periodically purging collected vapor to an intake manifold of the engine. The CPS valve in the known evaporative emission control system includes an electromagnetic solenoid that is under the control of a purge control signal generated by a microprocessor-based engine management system. The electromagnetic solenoid may be a digital on/off solenoid, or a proportional solenoid.

CPS valves that include a proportional solenoid are premium valves that use precision components to control the position of a flow restricting pintle. The position of the pintle is varied with the amount of current supplied to the solenoid. It is believed that known CPS valves that include a proportional solenoid have favorable response and control characteristics. However, known CPS valves that include a proportional solenoid suffer from a number of disadvantages, including high cost, as compared to valves having a lower parts count.

CPS valves that include a digital on/off solenoid have a low parts count and simple construction and are typically less costly than CPS valves that include a proportional solenoid. It is believed that known CPS valves that include a digital on/off solenoid have favorable response characteristics. However, known CPS valves that include a digital on/off solenoid suffer from a number of disadvantages, including poor control and high noise levels.

It is believed that there is a need for a CPS valve having the favorable response and control characteristics of a proportional solenoid valve, and the low manufacturing cost of a digital on/off solenoid valve.

SUMMARY OF THE INVENTION

In an embodiment, the invention provides a canister purge valve for regulating fuel vapor flow between a fuel vapor collection canister and an intake manifold of an internal combustion engine. The valve includes a body defining a passage extending between a first port and a second port. The first port may be adapted for fuel vapor communication with the canister, and the second port may be adapted for fuel vapor communication with the intake manifold. A seat may be disposed in the passage, and define an aperture having a sealing surface disposed about a central axis. An elastomeric actuator extends through the aperture. The elastomeric actuator is deformable between a first configuration that engages the sealing surface to prohibit fuel vapor flow through the aperture, and a second configuration spaced from the sealing surface to permit fuel vapor flow through the aperture.

The valve may include a stator, an electromagnetic coil, and an armature integrally formed at a first end of the actuator. A second end of the actuator may be fixed to the body. The elastomeric actuator may be deformable between the first configuration and the second configuration by energizing the electromagnetic coil to magnetically attract the armature toward the stator and deform the elastomeric actuator in the direction of the central axis. The elastomeric actuator may define a cylinder having a first length and a first diameter in the first configuration, and a second length and a second diameter in the second configuration, such that the first length is smaller than the second length, and the first diameter is larger than the second diameter. A stiffness of the elastomeric actuator may increase as the ambient temperature decreases, and the electromagnetic coil may be energized to compensate for the increased stiffness.

In another embodiment, the invention provides a valve for regulating fluid flow. The valve includes a body defining a passage extending between a first port and a second port. A seat may be disposed in the passage, and define an aperture having a sealing surface disposed about a central axis. An elastomeric actuator extends through the aperture, and is deformable between a first configuration that engages the sealing surface to prohibit fluid flow through the aperture, and a second configuration spaced from the sealing surface to permit fluid flow through the aperture.

In yet another embodiment, the invention provides a method of regulating fuel vapor flow between a fuel vapor collection canister and an intake manifold of an internal combustion engine, utilizing a canister purge valve. The valve includes a body defining a passage extending between a first port and a second port. The first port may be adapted for fuel vapor communication with the canister. The second port may be adapted for fuel vapor communication with the intake manifold. A seat may be disposed in the passage, and define an aperture having a sealing surface disposed about a central axis. An elastomeric actuator extends through the aperture. The method includes engaging the sealing surface with the elastomeric actuator to prohibit fuel vapor flow through the aperture, and disengaging the elastomeric actuator from the sealing surface to permit fuel vapor flow through the aperture.

The disengaging the elastomeric actuator may include energizing an electromagnetic coil to magnetically attract an armature toward a stator in the direction of the central axis. The electromagnetic coil may be energized to compensate for an increased stiffness of the elastomeric actuator as the ambient temperature decreases.

BRIEF DESCRIPTION Of THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
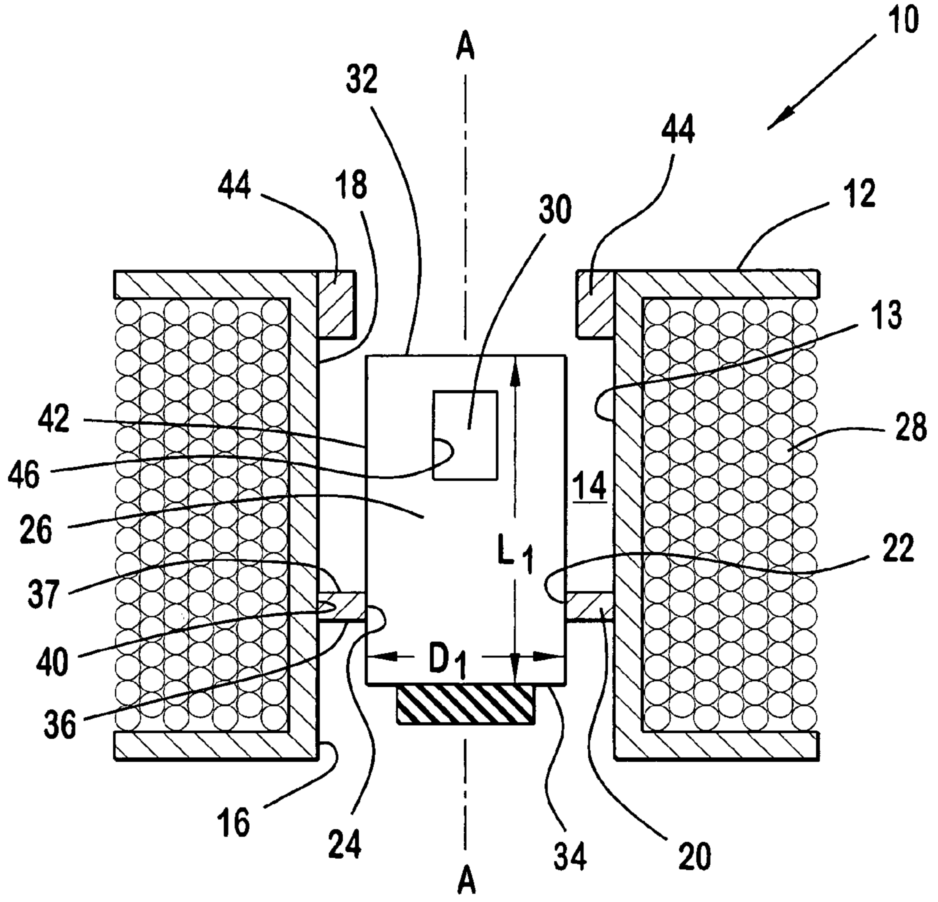
FIG. 1 is an apparatus for controlling flow with an elastomeric actuator in the closed configuration, according to an embodiment of the invention.

FIG. 1 illustrates a preferred embodiment of an apparatus for controlling flow with an elastomeric actuator. In the preferred embodiment, apparatus 10 is a canister purge valve for regulating fuel vapor flow between a fuel vapor collection canister and an intake manifold of an internal combustion engine. Apparatus 10 includes a body 12, illustrated schematically in FIG. 1. Body 12 may be in the form of a known valve body. For example, body 12 may be a plastic injection-molded solenoid valve body, suitable for exposure to fuel vapor. Body 12 may include a wall 13 that defines a passage 14 extending between a first port 16 and a second port 18. The first port 16 may be adapted for fuel vapor communication with the fuel vapor collection canister (not shown). The second port 18 may be adapted for fuel vapor communication with the intake manifold of the internal combustion engine (also not shown). Preferably, passage 14 is circular at a cross-section perpendicular to axis A-A.

Figure 2:
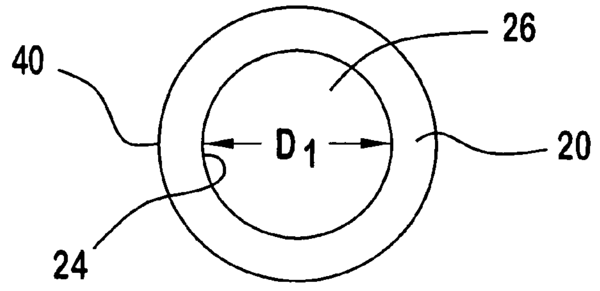
FIG. 2 is a top view of the apparatus of FIG. 1.

Apparatus 10 may include a seat 20 disposed within the passage 14 intermediate the first port 16 and the second port 18. As shown in FIG. 2, seat 20 is preferably in the form of an annulus. Referring back to FIG. 1, seat 20 includes a first surface 36, a second surface 38, a third surface 40, and a fourth surface 24. First surface 36 faces first port 16, and second surface 38 faces second port 18. Third surface 40 extends between first surface 36 and second surface 38, and forms a vapor tight seal with wall 13. The vapor tight seal may be formed with a vapor tight adhesive between third surface 40 and wall 13. In a preferred embodiment, seat 20 is formed integrally with wall 13, for example during the plastic-injection molding of body 12. Fourth surface 24 extends between first surface 36 and second surface 38, defines an aperture 22, and forms a sealing surface as described in more detail below.

Apparatus 10 includes an actuator 26. Actuator 26 is formed of an elastomeric material, for example rubber. The elastomeric actuator 26 is preferably in the form of a cylindrical member having a first end 32, a second end 34, and a side wall 42 extending between first end 32 and second end 34. The elastomeric actuator 26 extends through the aperture 22 along the axis A-A. An armature 30, formed of a ferrous material, may be integrally formed with elastomeric actuator 26 at the first end 32. As shown in FIG. 1, the elastomeric actuator 26 is formed around armature 30 such that armature 30 is disposed in a cylinder-shaped void 46 in elastomeric actuator 26. Armature 30 may be integrally formed with the elastomeric actuator 26 at the first end 32 in other ways, as long as armature 30 is sufficiently connected to first end 32 so that the elastomeric actuator 26 deforms when the armature 30 is subjected to a motive force, as described below. For example, armature 30 may be attached to the first end 32 with an adhesive, or armature 30 may be attached to first end 32 with a connector member. The second end 34 of the elastomeric actuator 26 may be fixed to the body 12, as is illustrated schematically in FIG. 1. Second end 34 may be fixed to body 12 via a support member (not shown) attached to wall 13. The support member may be formed of any suitable shape, as long as second end 34 can be attached to the support member, and the support member permits fuel vapor flow through passage 14, as described below. For example, the support member may be formed of two crossed beams that provide four points for attachment to wall 13, while also providing four paths for vapor flow.

The elastomeric actuator 26 is elastically deformable between a first configuration and a second configuration. FIGS. 1 and 2 show the elastomeric actuator 26 in the first configuration wherein the side wall 42 matingly engages the sealing surface 24, prohibiting fuel vapor flow through the aperture 22. In the first configuration, elastomeric actuator 26 has a first length $L_1$ and a first diameter $D_1$.

Figure 3:
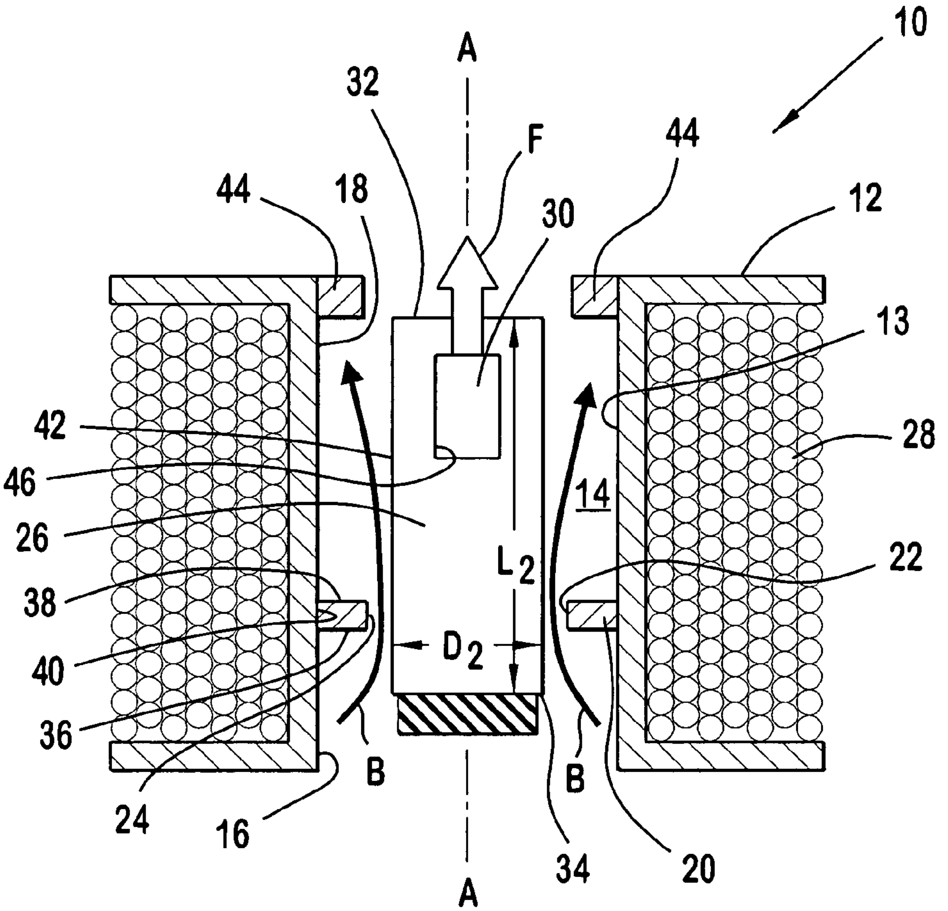
FIG. 3 is the apparatus of FIG. 1 in the open configuration.
Figure 4:
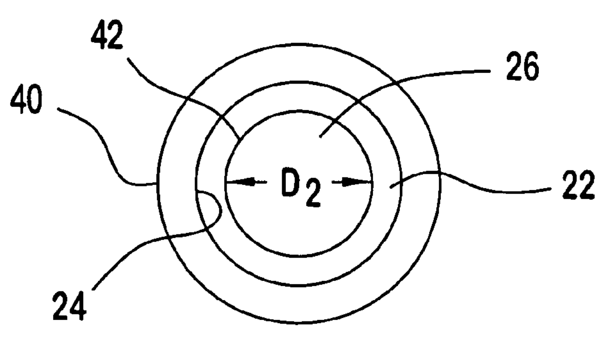
FIG. 4 is a top view of the apparatus of FIG. 3.

As described above, actuator 26 is formed of an elastomeric material, and in a preferred embodiment, actuator 26 is formed of rubber. Poisson's ratio is the ratio between lateral strain and longitudinal strain and generally varies between 0.3 and 0.5 for most rubber materials. So when elastomeric actuator 26 is subjected to an axial tensile force F, as shown in FIG. 3, the elastomeric actuator 26 deforms to the second configuration such that the length increases to $L_2$ and the diameter decreases to $D_2$. The decrease in the diameter of the elastomeric actuator 26 from $D_1$ to $D_2$ breaks the vapor seal between side wall 42 and sealing surface 24, thus permitting fuel vapor flow through the aperture 22 in the direction of arrows B,B. FIG. 4 shows elastomeric actuator 26 deformed to the second configuration such that the diameter decreases to $D_2$, breaking the vapor seal between side wall 42 and sealing surface 24, to form a flow path through aperture 22.

Apparatus 10 may include electromagnetic coil 28 and stator 44. In a preferred embodiment, the axial tensile force F is created by energizing the electromagnetic coil 28 to produce a magnetic force that attracts the armature 30, formed integrally with elastomeric actuator 26 at the first end 32, toward the stator 44. With the second end 34 of the elastomeric actuator 26 fixed to the body 12, the elastomeric actuator 26 is deformed from the first configuration to the second configuration, permitting fuel vapor flow through the aperture 22. The elastomeric actuator 26 returns to the first configuration when the electromagnetic coil 28 is de-energized, prohibiting fuel vapor flow through the aperture 22. The amount of vapor flow through aperture 22 may be increased by increasing the force F generated by the magnetic coil 28, and the amount of vapor flow through aperture 22 may be decreased by decreasing the force F generated by the magnetic coil 28.

The material forming the elastomeric actuator 26 may possess a stiffness property that changes with a change in ambient conditions, such as a change in ambient temperature. As the ambient temperature decreases, the stiffness of the elastomeric actuator 26 may increase, thus requiring a stronger axial tensile force F to achieve a desired reduction in the diameter of the elastomeric actuator 26. Moreover, the coil 28 may have a higher resistance in the decreased ambient temperature. Thus, the preferred embodiment may have a sensor to measure the ambient temperature, and a control circuit to adjust the control signal to the coil 28, generate a proper magnetic force, and achieve a desired reduction in the diameter of the elastomeric actuator 26.

The preferred embodiment provides numerous advantages. For example, the preferred embodiment provides a CPS valve having the favorable response and control characteristics of a proportional solenoid valve, and the low manufacturing cost of a digital on/off solenoid valve. The preferred embodiment provides a CPS valve having a reduced number of parts. For example, the valve achieves a vapor seal directly between the actuator and the seat, rather than between an additional closure member and the seat, as in known valves. Moreover, the valve does not require precision alignment along the flow axis between the seat and a closure member, thus simplifying the design and manufacturing processes.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claim is:

1. A canister purge valve for regulating fuel vapor flow between a fuel vapor collection canister and an intake manifold of an internal combustion engine, that canister purge valve comprising:

a body defining a passage extending between a first port and a second port, the first port adapted for fuel vapor communication with fuel vapor collection canister, and the second port adapted for fuel communication with the intake manifold of the internal combustion engine;

a seat disposed in the passage, the seat defining aperture having a sealing surface, the sealing surface disposed about central axis;

an elastomeric actuator extending through the aperture, the elastomeric actuator being deformable between a first configuration that engages the sealing surface to prohibit fuel vapor flow through the aperture, and a second configuration spaced from the scaling surface to permit fuel vapor flow through the aperture, a stator;

an electromagnetic coil; and an armature integrally formed proximate first end of the elastomene actuator.

2. The canister purge valve of claim 1, wherein a second end of the elasomeric actuator is fixed with respect to the body; and wherein the elastomeric actuator is deformable between the first configuration and the second configuration by energizing the electromagnetic coil to magnetically attract the armature toward the stator and default the elastorlieric actuator in the direction of the central axis.

3. The canister purge valve of claim 2, wherein the elastomeric actuator defines a cylinder, the cylinder having a first length and a first diameter in the first configuration the cylinder having a second length and a second diameter in the second configuration; and wherein the first length is smaller than the second length, and the first diameter is larger than the second diameter.

4. The canister purge valve of claim 3, wherein a stiffness of the clastortieric actuator increases as an ambient temperature decreases; and wherein the electromagnetic coil is energized to compensate for the increased stiffness.

5. A method of regulating fuel vapor flow between a fuel vapor collection canister and an intake manifold of an internal combustion engine, utilizing a canister valve, the valve including a body defining a passage extending between a first port and a second port, the port adapted for fuel vapor communication with the fuel vapor collection canister, and the second port adapted for fuel vapor communication with the intake manifold of the internal combustion engine, a seat disposed in the passage, the seat defining an aperture having sealing surface, the sealing surface disposed about a central axis, and an elastomeric actuator extending through the aperture, the method comprising:

engaging the sealing surface with the elastomeric actuator to prohibit fuel vapor flow through the aperture: and disengaging the elastomeric actuator from the sealing surface to permit fuel vapor flow through the aperture: the disengaging including;

energizing an electromagnetic coil to magnetically attract an armature toward a stator in the direction of the central axis: and energizing the elastomeric coil to compensate for an increased stiffness of the elastomeric actuator as an ambient temperature decreases.

* * * * *